United States Patent
Zhu et al.

(10) Patent No.: US 9,524,743 B2
(45) Date of Patent: Dec. 20, 2016

(54) HEAT ASSISTED MAGNETIC RECORDING FOR BIT-PATTERNED MEDIA

(71) Applicant: Seagate Technology LLC, Cupertino, CA (US)

(72) Inventors: Wenzhong Zhu, Apple Valley, MN (US); Kaizhong Gao, North Oaks, MN (US); Edward Gage, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/734,235

(22) Filed: Jun. 9, 2015

(65) Prior Publication Data

US 2016/0148635 A1 May 26, 2016

Related U.S. Application Data

(60) Provisional application No. 62/138,598, filed on Mar. 26, 2015, provisional application No. 62/083,696, filed on Nov. 24, 2014, provisional application No. 62/083,732, filed on Nov. 24, 2014.

(51) Int. Cl.
| | |
|---|---|
| *G11B 5/09* | (2006.01) |
| *G11B 7/1263* | (2012.01) |
| *G11B 5/74* | (2006.01) |
| *G11B 5/012* | (2006.01) |
| *G11B 5/00* | (2006.01) |

(52) U.S. Cl.
CPC .............. *G11B 7/1263* (2013.01); *G11B 5/012* (2013.01); *G11B 5/09* (2013.01); *G11B 5/746* (2013.01); *G11B 2005/0021* (2013.01); *G11B 2220/252* (2013.01)

(58) Field of Classification Search
None
See application file for complete search history.

(56) References Cited

U.S. PATENT DOCUMENTS

| | | |
|---|---|---|
| 4,298,897 A | 11/1981 | Arter et al. |
| 4,622,601 A | 11/1986 | Isozaki et al. |
| 4,646,168 A | 2/1987 | Sonobe et al. |

(Continued)

FOREIGN PATENT DOCUMENTS

| | | |
|---|---|---|
| EP | 0484774 A2 | 5/1992 |
| EP | 1564736 | 8/2005 |

(Continued)

*Primary Examiner* — Brian Butcher
(74) *Attorney, Agent, or Firm* — Holzer Patel Drennan

(57) ABSTRACT

A heat-assisted magnetic recording (HAMR) device includes a controller that selects a power for operating a heat source for a data write to a target data track. According to one implementation, the controller selects the power based on an assessment of whether the target data track is bounded by any data-storing tracks. A first power is selected when the data track is not bounded by any data-storing tracks and a second lower power is selected when the data track is bounded by one or more data-storing tracks. In another implementation, the controller writes to different partitioned regions of a storage media with different powers of the heat source. The controller selects a storage location for data based on an expected write error rate and environmental conditions within the HAMR device.

18 Claims, 7 Drawing Sheets

(56) References Cited

U.S. PATENT DOCUMENTS

| | | |
|---|---|---|
| 4,771,346 A | 9/1988 | Shoji et al. |
| 4,803,571 A | 2/1989 | Fujioka et al. |
| 4,853,799 A | 8/1989 | Aikawa |
| 5,010,430 A | 4/1991 | Yamada et al. |
| 5,285,341 A | 2/1994 | Suzuki et al. |
| 5,402,270 A | 3/1995 | McDonnell et al. |
| 5,760,993 A | 6/1998 | Purkett |
| 5,892,634 A | 4/1999 | Ito et al. |
| 5,978,168 A | 11/1999 | Mathews et al. |
| 6,052,797 A | 4/2000 | Ofek et al. |
| 6,104,562 A | 8/2000 | Ottesen et al. |
| 6,185,063 B1 | 2/2001 | Cameron |
| 6,710,960 B1 | 3/2004 | Yorimitsu |
| 6,768,605 B2 | 7/2004 | Yamamoto |
| 7,130,152 B1 | 10/2006 | Raymond et al. |
| 7,259,927 B2 | 8/2007 | Harris |
| 7,393,066 B2 | 7/2008 | Dugas et al. |
| 7,440,222 B2 | 10/2008 | Nakamura et al. |
| 7,573,682 B2 | 8/2009 | Pust et al. |
| 7,872,829 B2 | 1/2011 | Sakai |
| 7,907,360 B2 | 3/2011 | Mak et al. |
| 7,957,093 B2 | 6/2011 | Brand |
| 7,965,465 B2 | 6/2011 | Sanvido et al. |
| 8,023,215 B1 | 9/2011 | Ghaly et al. |
| 8,310,777 B2 | 11/2012 | Biskeborn et al. |
| 8,310,782 B2 | 11/2012 | Song et al. |
| 8,531,792 B1 | 9/2013 | Burd et al. |
| 8,531,793 B2 | 9/2013 | Bandic et al. |
| 8,599,510 B1 | 12/2013 | Fallone |
| 8,693,123 B1 | 4/2014 | Guo et al. |
| 8,699,159 B1 | 4/2014 | Malina |
| 8,699,162 B1 | 4/2014 | Grobis et al. |
| 8,711,517 B2 | 4/2014 | Erden et al. |
| 8,854,752 B2 | 10/2014 | Jin et al. |
| 8,867,161 B2 | 10/2014 | Emo et al. |
| 8,873,178 B2 | 10/2014 | Erden et al. |
| 8,913,335 B2 | 12/2014 | Coker et al. |
| 8,917,469 B1 | 12/2014 | Guo et al. |
| 8,929,186 B1 | 1/2015 | Sharma et al. |
| 8,976,478 B1 | 3/2015 | Harllee, III et al. |
| 9,053,712 B1 | 6/2015 | Guo et al. |
| 9,058,829 B1 | 6/2015 | Wolf et al. |
| 9,082,458 B1 | 7/2015 | Tang |
| 9,087,541 B1 | 7/2015 | Pokharel et al. |
| 9,099,103 B1 | 8/2015 | Krichevsky |
| 9,105,302 B1 | 8/2015 | Erden et al. |
| 9,111,575 B1 | 8/2015 | Zhou et al. |
| 9,111,578 B1 | 8/2015 | Hassel et al. |
| 9,129,658 B1 | 9/2015 | Yamamoto |
| 9,142,246 B1 | 9/2015 | Trantham et al. |
| 9,153,287 B1 | 10/2015 | Hamilton et al. |
| 9,324,362 B1 | 4/2016 | Gao et al. |
| 9,396,062 B1 | 7/2016 | Sridhara et al. |
| 2002/0035666 A1 | 3/2002 | Beardsley et al. |
| 2002/0035704 A1 | 3/2002 | Wilson |
| 2002/0105867 A1 | 8/2002 | Tamaru et al. |
| 2005/0078399 A1 | 4/2005 | Fung et al. |
| 2005/0157597 A1* | 7/2005 | Sendur .............. B82Y 10/00 369/13.55 |
| 2006/0215511 A1 | 9/2006 | Shin et al. |
| 2007/0047415 A1 | 3/2007 | Chang |
| 2007/0050593 A1 | 3/2007 | Chen et al. |
| 2007/0174582 A1 | 7/2007 | Feldman |
| 2008/0002272 A1 | 1/2008 | Riedel |
| 2008/0239901 A1 | 10/2008 | Tsunokawa et al. |
| 2008/0316639 A1 | 12/2008 | Tang et al. |
| 2009/0244775 A1 | 10/2009 | Ehrlich |
| 2009/0251821 A1 | 10/2009 | Song et al. |
| 2010/0027406 A1 | 2/2010 | Krause et al. |
| 2010/0271727 A1 | 10/2010 | Namkoong et al. |
| 2010/0321817 A1 | 12/2010 | Aida et al. |
| 2012/0014013 A1 | 1/2012 | Bandic et al. |
| 2013/0148225 A1 | 6/2013 | Coker et al. |
| 2013/0155826 A1 | 6/2013 | Zhang et al. |
| 2013/0294207 A1 | 11/2013 | Erden et al. |
| 2014/0016224 A1 | 1/2014 | Unoki et al. |
| 2014/0043708 A1 | 2/2014 | Erden et al. |
| 2014/0055881 A1 | 2/2014 | Zaharris |
| 2014/0153134 A1 | 6/2014 | Han et al. |
| 2014/0160589 A1 | 6/2014 | Deki et al. |
| 2015/0178161 A1 | 6/2015 | Burd et al. |
| 2016/0148630 A1 | 5/2016 | Rausch |
| 2016/0148635 A1 | 5/2016 | Zhu et al. |
| 2016/0148636 A1 | 5/2016 | Ma et al. |
| 2016/0148637 A1 | 5/2016 | Rausch et al. |
| 2016/0148642 A1 | 5/2016 | Gao et al. |
| 2016/0148643 A1 | 5/2016 | Gao et al. |
| 2016/0148644 A1 | 5/2016 | Zhu et al. |
| 2016/0148645 A1 | 5/2016 | Zhu et al. |

FOREIGN PATENT DOCUMENTS

| | | |
|---|---|---|
| JP | 02240862 A | 9/1990 |
| WO | 2005-030869 A1 | 4/2005 |

* cited by examiner

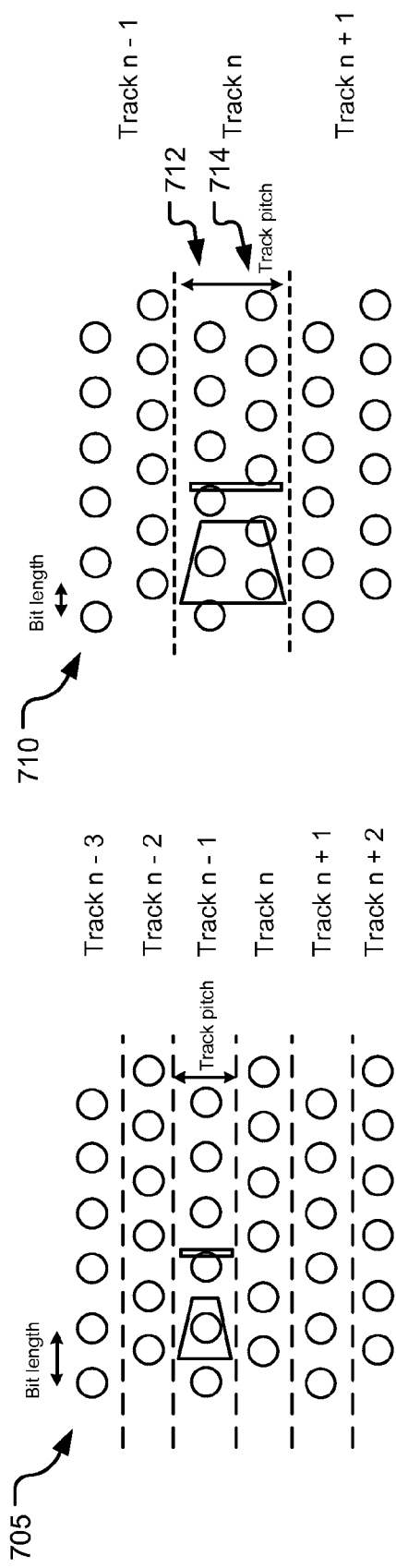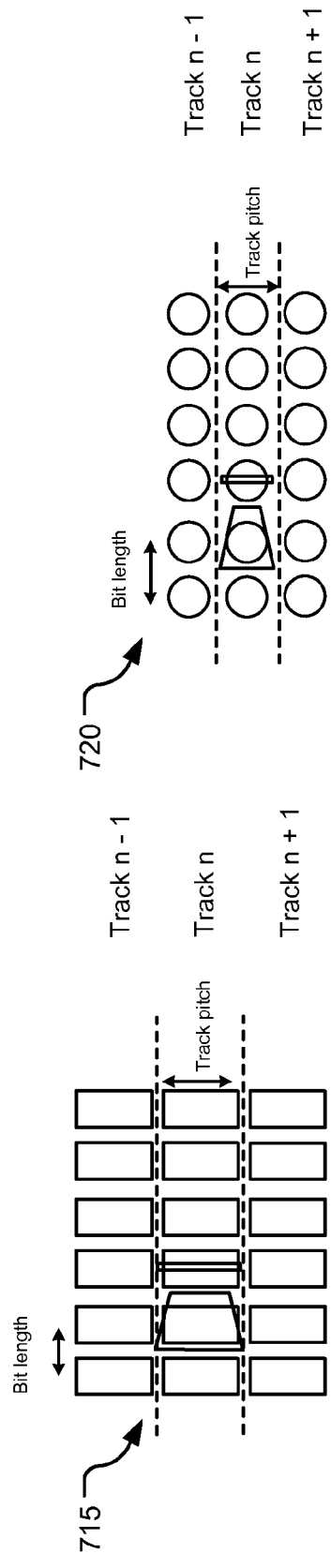
FIG. 7A
FIG. 7B
FIG. 7C
FIG. 7D

HEAT ASSISTED MAGNETIC RECORDING FOR BIT-PATTERNED MEDIA

CROSS-REFERENCE TO RELATED APPLICATIONS

The present application claims benefit of priority to U.S. Provisional Application No. 62/083,696, entitled "Interlaced Magnetic Recording in HAMR Devices" and filed on Nov. 24, 2014, and also to U.S. Provisional Patent Application No. 62/083,732, entitled "Interlaced Magnetic Recording" and filed on Nov. 24, 2014, and also to U.S. Provisional Patent Application No. 62/138,598, entitled "Heat Assisted Magnetic Recording for Bit-Patterned Media" and filed on Mar. 26, 2015. Each of these applications is specifically incorporated by reference for all that it discloses or teaches.

BACKGROUND

Bit-patterned media (BPM) is seen as a way to increase areal recording density as compared to recording on a continuous media. In a BPM, magnetic material on a disc is patterned into small isolated blocks or islands such that there is a single magnetic domain in each island or "bit." The media may be fabricated so that there is no magnetic material in the regions between each bit. The single magnetic domains can be a single grain or a plurality of strongly coupled grains that switch magnetic states in concert as a single magnetic volume. This is in contrast to continuous magnetic media wherein a single "bit" may have multiple magnetic domains separated by domain walls. Unlike a continuous media, a BPM includes bits at fixed, predefined locations. Writing to each fixed bit location entails precise timing of a magnetic write pulse generated by a recording head.

According to one implementation, a heat-assisted magnetic recording (HAMR) storage device includes a controller that selects a heat source power level for writing data to a target data track based on whether the target data track is bounded by one or more data-storing tracks. According to another implementation, a storage device calculates an expected write error rate based on environmental conditions within the storage device and selects between a first region and a second region to write data of a write command based on the expected write error rate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

FIG. 7A illustrates an example staggered single-track BPM suitable for implementing the disclosed technology.

FIG. 7B illustrates an example staggered hypertrack BPM suitable for implementing the disclosed technology.

FIG. 7C illustrates an example non-staggered rectangular BPM suitable for implementing the disclosed technology.

FIG. 7D illustrates an example non-staggered hexagonal BPM suitable for implementing the disclosed technology.

DETAILED DESCRIPTION

Figure 1:
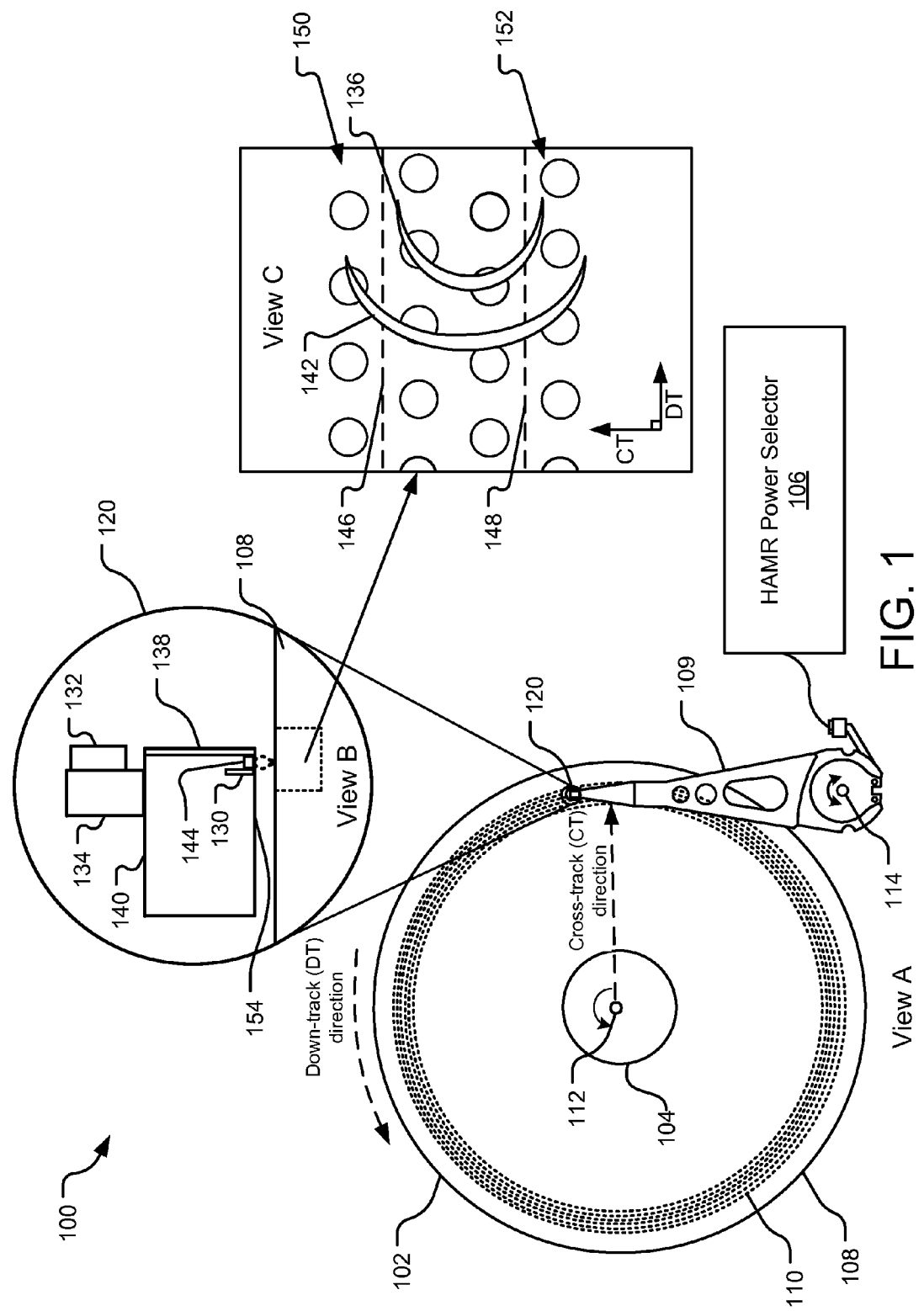
FIG. 1 illustrates an example data storage device including a transducer head assembly for writing data on a magnetic storage medium.

FIG. 1 illustrates an example data storage device 100 including a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole (e.g., a write pole 130) and from which data bits can be read using a magnetoresistive element (not shown). As illustrated in View A, the storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the storage medium 108.

The transducer head assembly 120 is mounted on an actuator assembly 109 at an end distal to an actuator axis of rotation 114. The transducer head assembly 120 flies in close proximity above the surface of the storage medium 108 during disc rotation. The actuator assembly 109 rotates during a seek operation about the actuator axis of rotation 112. The seek operation positions the transducer head assembly 120 over a target data track for read and write operations.

In one implementation employing heat-assisted magnetic recording (HAMR) (e.g., View B), magnetic grains on the storage medium 108 are temporarily heated during the recording process to selectively lower magnetic coercivity in a tightly focused area of the storage medium 108 that substantially corresponds to an individual data bit. The heated region is then encoded with the recorded data bit based on the polarity of an applied magnetic write field. After cooling, the magnetic coercivity substantially returns to its pre-heating level, thereby stabilizing the magnetization for that data bit. This write process is repeated for multiple data bits on the storage medium, and such data bits can be read using a magneto-resistive read head.

Referring to View B, the transducer head assembly 120 includes, among other features, a heat source 132 (e.g., a laser) coupled to a submount assembly 134. Light from the heat source 132 is directed into a waveguide 138 mounted to a slider 140. Light exiting the waveguide is focused, via a Near Field Transducer (NFT) 144, and applied to a bit location on the storage medium 108 as the bit location is subjected to a magnetic pulse generated by the write pole 130. As an air-bearing surface 154 of the slider 140 "flies" across the surface of the storage medium 108, the write pole 130 selectively magnetizes the underlying magnetic grains of the storage medium 108.

If the storage medium 108 is a bit-patterned media (BPM)(as shown in View C), data bits are formed on the storage medium 108 at fixed, predefined locations separated from one another by non-magnetic material. As the write pole 130 passes over the fixed data bits of the rotating storage medium 108, the write pole 130 emits a series of magnetic pulses each of sufficient magnitude to perform a write transition that changes a magnetic state of an underlying data bit. To selectively write data to an individual data bit, the magnetic pulses of the write pole 130 are timed to precisely align with the passing of each of the data bits beneath the write pole 130. If the write pole 130 is misaligned during a write transition, then the corresponding misalignment of the magnetic pulse can cause a bit to experience conflicting magnetization forces from the writer, resulting in improperly written data and stored data corruption.

As illustrated by view C, varying a power of the heat source 132 varies a corresponding size and shape of corresponding write transition field lines 142 and 136. In one implementation, the write transition field line 142 is generated by operating the heat source 132 at a higher power than that the power utilized to generate the write transition field line 136. In general, increasing the power of the heat source 132 increases the radial span and decreases curvature of the corresponding write transition field line.

To reduce write error, a write transition to an individual data bit is performed when a write sync margin corresponding to that data bit is maximized. The write sync margin is the distance that a write transition field line (e.g., 142 or 136) can shift in either cross-track direction at the time of a transition without causing an error to one or more adjacent data bits. Performing a write transition when the write sync margin is large decreases the likelihood of write error to bits in a data track aligned with the write pole 130.

Due to its decreased curvature, the write transition field line 142 is associated with a larger write sync margin and fewer resulting on-track write errors than the write transition field line 136. In other words, a higher power of the heat source 132 correlates with a decrease in an on-track (e.g., target track) write error rate. However, this observed decrease in the on-track write error rate is, in some implementations, offset by an observed increase in corruption of data on adjacent data tracks.

For instance, the write transition field line 142 is so long in the radial (e.g., cross-track) direction that it extends over data track boundaries 146 and 148 and may have the effect of corrupting some of the data in adjacent data tracks 150 and 152. Therefore, many BPM recording systems provide a trade-off between low on-track error rate and data corruption of adjacent data tracks.

A HAMR power selector 106 selects a power of the heat source 132 for execution of write commands according to different methodologies designed to optimize the above-described tradeoff. Heat source power selection is based on one or a combination of considerations including, for example, a target storage location of the data, whether or not data is stored on data tracks adjacent to the target storage location, environmental conditions within the storage drive (e.g., temperature, shock, vibration, etc.), a I/O requirements for the data, priority of each write operation, etc. Specific example implementations are described in detail with respect to the following figures.

Figure 2:
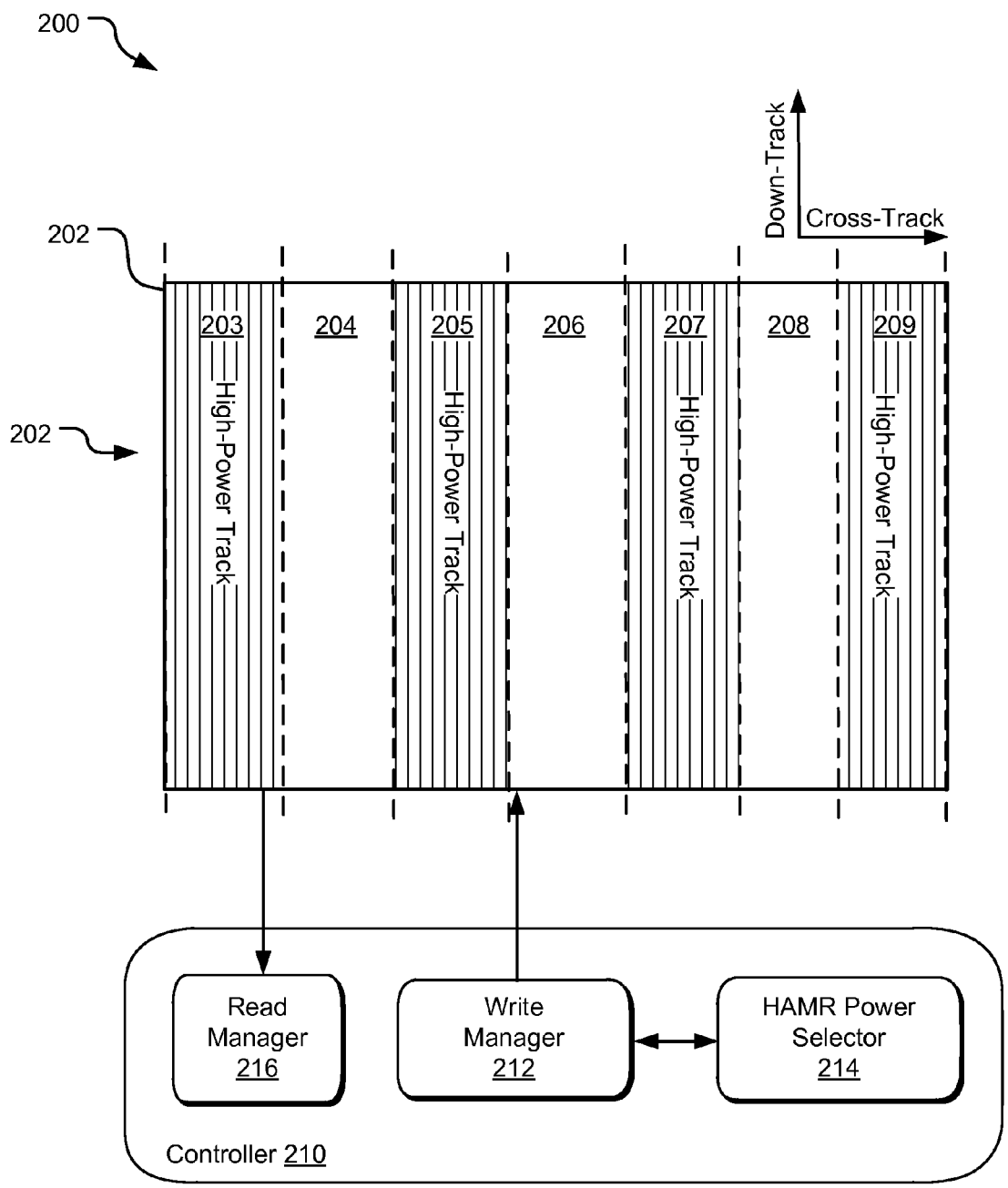
FIG. 2 illustrates data management techniques in an example heat-assisted magnetic recording (HAMR) device for reading and writing data to a bit patterned media (BPM).

FIG. 2 illustrates data management techniques in an example storage device 200 including a controller 210 for reading and writing data to a BPM 202. The controller 210 further includes a write manager 212 for selecting a storage location for incoming data and a HAMR power selector 214 for selecting a heat source power (e.g., laser power) for operating a HAMR recording head during each write operation. The BPM 202 has a number of substantially circular data tracks (e.g., data tracks 203, 204, 205, 206, 207, 208, and 209) including a series of magnetic islands "data bits" of magnetic material separated from one another by non-magnetic material. Each of the data tracks has a substantially constant track width ($\Delta W$).

The write manager 212 generates and/or receives a series of write commands (e.g., originating from a host device or firmware of the controller 210) and queries the HAMR power selector 214 to select a heat source power for execution of each write command. The HAMR power selector 214 selects between two or more potential power settings. In some implementations, different radial zones of the BPM 202 are associated with different potential power settings.

The controller 210, write manager 212, and HAMR power selector 214 may each include software and/or hardware elements, and may be implemented in any tangible computer-readable storage media within or communicatively coupled to the storage device 200. As used herein, the term "tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by a mobile device or computer. In contrast to tangible computer-readable storage media, intangible computer-readable communication signals may embody computer readable instructions, data structures, program modules or other data resident in a modulated data signal, such as a carrier wave or other signal transport mechanism.

In one implementation, the HAMR power selector 214 selects between two potential power settings for the HAMR heat source based on current capacity of the BPM 202. Responsive to receipt of a write command, the HAMR power selector 214 initially determines whether or not a capacity condition is satisfied. A capacity condition may be, for example, a capacity relating to currently available storage space or data tracks. For example, a capacity condition may be satisfied when 50% or more of the data tracks on the BPM 202 or in a specific region of the BPM 202 store data. If the capacity condition is not satisfied, the HAMR power selector 214 selects the high heat source power and the write manager 212 writes data to alternating data tracks (as shown). If the capacity condition is satisfied, the HAMR power selector 214 applies further logic (e.g., logic that is discussed in greater detail below with respect to FIG. 3).

Writing data with a high heat source power provides for an increased write sync margin and decreased on-track write errors. However, one consequence of writing data at the high heat source power is that a write transition field line (not shown) generated by a HAMR recording head may have a radial span that exceeds the width (cross-track width) of an individual data track, resulting in magnetization and/or corruption of bits of the directly adjacent data tracks. In the illustrated case, no data is stored on the interlaced data tracks 204, 206, and 208. Therefore, there is no risk of data corruption on these tracks.

In FIG. 2, the write manager 212 may relax an imposed On Cylinder Limit (OCLIM) as compared to other implementations when writing data at a lower heat source power. The OCLIM refers to a detected error in an alignment between the center of a target data track and a recording head. In some implementations, effective writing of data to a BPM drive relies on precise timing and alignment between each bit and the magnetic write pulse of the HAMR head.

When writing data at a higher heat source power and to every other data track (as shown), timing and alignment are less critical because there is no risk of corrupting data on the interlaced (e.g., blank) data tracks. Therefore, the OCLIM can be relaxed (e.g., increased) when writing data as shown in FIG. 2 as compared to when executing data writes to every consecutive data track.

Another benefit of the illustrated data management technique is that some data integrity verification procedures may be performed less frequently or not at all while data is written to every other data track, as shown. For example, some recording devices regularly perform direct offline scan (DOS) operations after each write operation to monitor and/or correct data degradation attributable to adjacent track interference (ATI). Due to significant processing overhead, regular and frequent DOS operations reduce device performance. In the implementation of FIG. 2, DOS operations may be disabled or performed less frequency because there is no risk of ATI when data is not stored in the interlaced data tracks 204, 206, 208, etc.

The storage device 200 further includes a read manager 216. In some implementations, the read manager 216 reads back newly-written data after each write operation. This allows for early identification and correction of write errors.

Figure 3:
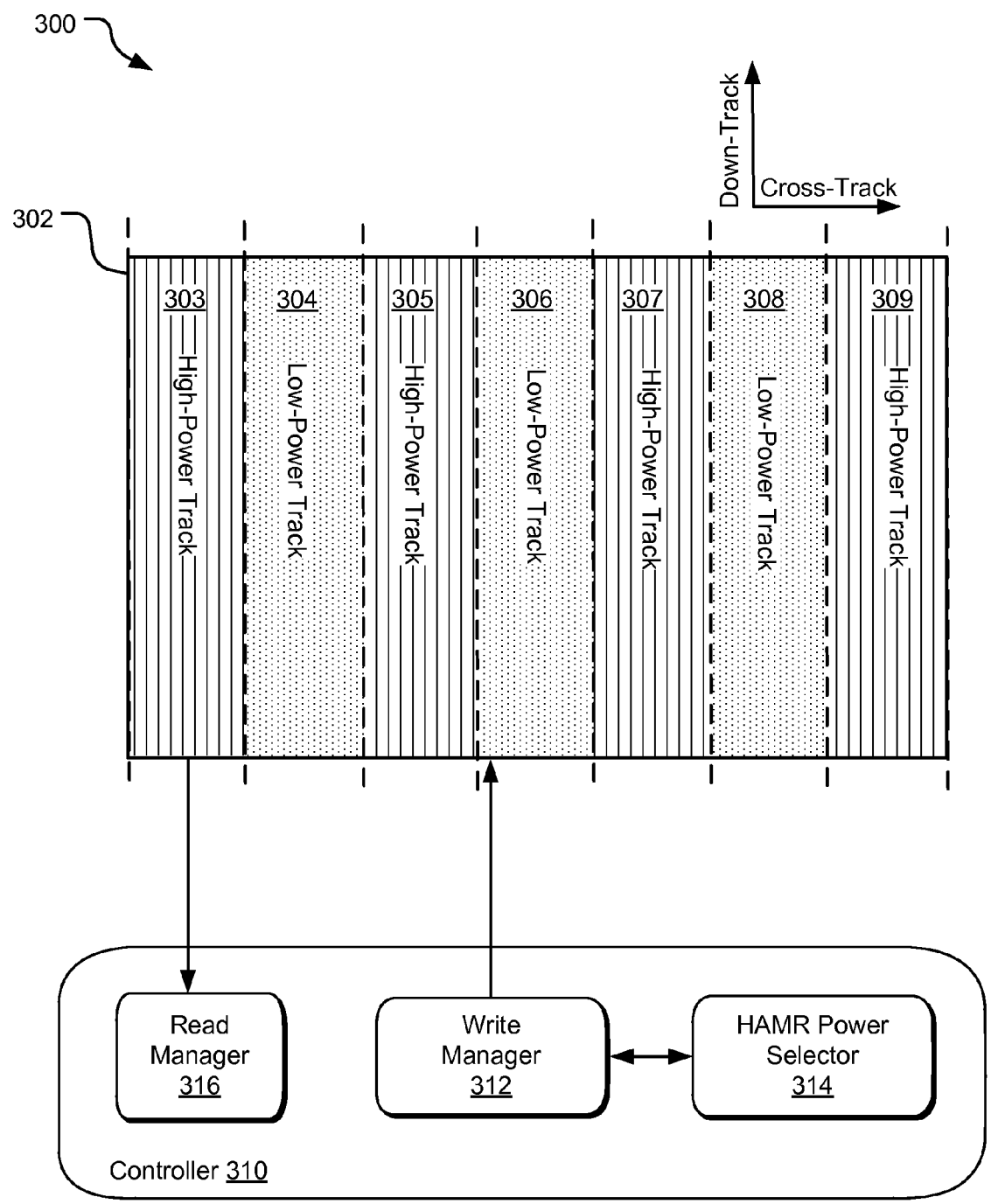
FIG. 3 illustrates further data management techniques in an example HAMR device.

FIG. 3 illustrates additional data management techniques in an example storage device 300. The storage device 300 includes a controller 310 for reading and writing data to a BPM 302. The BPM 302 has a number of substantially circular data tracks (e.g., data tracks 303, 304, 305, 306, 307, 308, and 309) of a substantially uniform track width ($\Delta W$).

The write manager 312 generates and/or receives a series of write commands (e.g., originating from a host device or firmware of the controller 310) and queries a HAMR power selector 314 to select between two or more potential power settings for execution of each write command. The controller 310 further includes a read manager 316 that manages incoming read commands (e.g., originating from a host device or firmware of the controller 310).

In one implementation, the HAMR power selector 314 selects between a high power and a comparatively low power. If a capacity condition is not satisfied, the HAMR power selector 314 selects the high heat source power and the write manager 312 writes data to alternating data tracks (e.g., 303, 305, 307, 309). When writing at the high power, the controller 310 may relax (increase) a positioning requirement of a HAMR head (e.g., OCLIM).

If the HAMR power selector determines that the capacity condition is satisfied, the HAMR heat source power selector 314 applies further logic to select the power setting for executing each of the incoming write commands. In particular, the HAMR power selector 314 identifies whether a target data track of a write command is one of the alternating data tracks (e.g., 303, 305, 307, 309) or one of the interlaced tracks (e.g., 304, 306, 308, etc.). If incoming data is directed to one of the interlaced data tracks, the HAMR power selector 314 selects a lower heat source power than the heat source power initially used to write data to the first series of alternating data tracks 303, 305, 307, and 309. When writing at the low power, the controller 310 imposes a more stringent positioning requirement (e.g., a narrower OCLIM) than when writing at the high power. The difference between the high and low heat source powers may vary considerably in different implementations depending on the BPM on other specific system criteria. However, in one implementation, a ratio of the respective write widths when operating at the high heat source power (to write the high-power track) and low heat source power (to write the low-power track) is between about 1.2/1 and 2/1.

If the capacity condition is satisfied and a target data track of an incoming write command is one of the alternating tracks (e.g., 305, 307, 309, etc.), the HAMR power selector 314 next determines whether the target data track is directly adjacent to one or more data-storing tracks. As used here, a "data-storing track" is a data track storing data or servo information (as opposed to a blank data track). If the target data track of the alternating data tracks (e.g., 303, 305, 307 or 309) is not directly adjacent to one or more data-storing tracks, the write manager 312 writes data of the write command to the target data track at the first (higher) heat source power. This results in minimal on-track write errors.

If, however, the target data track is directly adjacent to one or more data-storing tracks, the target data track is written at the second (lower) power. For example, the write manager 312 may receive a command to re-write or modify the data track 305 after data has already been written to one or both of the interlaced data tracks 304 and 306. In this case, re-writing the data track 305 at the first (higher) power may cause corruption of data stored in either of the data tracks 304 and 306. Therefore, the HAMR power selector 314 selects the lower power to re-write the data track 305 (initially written at the higher power).

Figure 4:
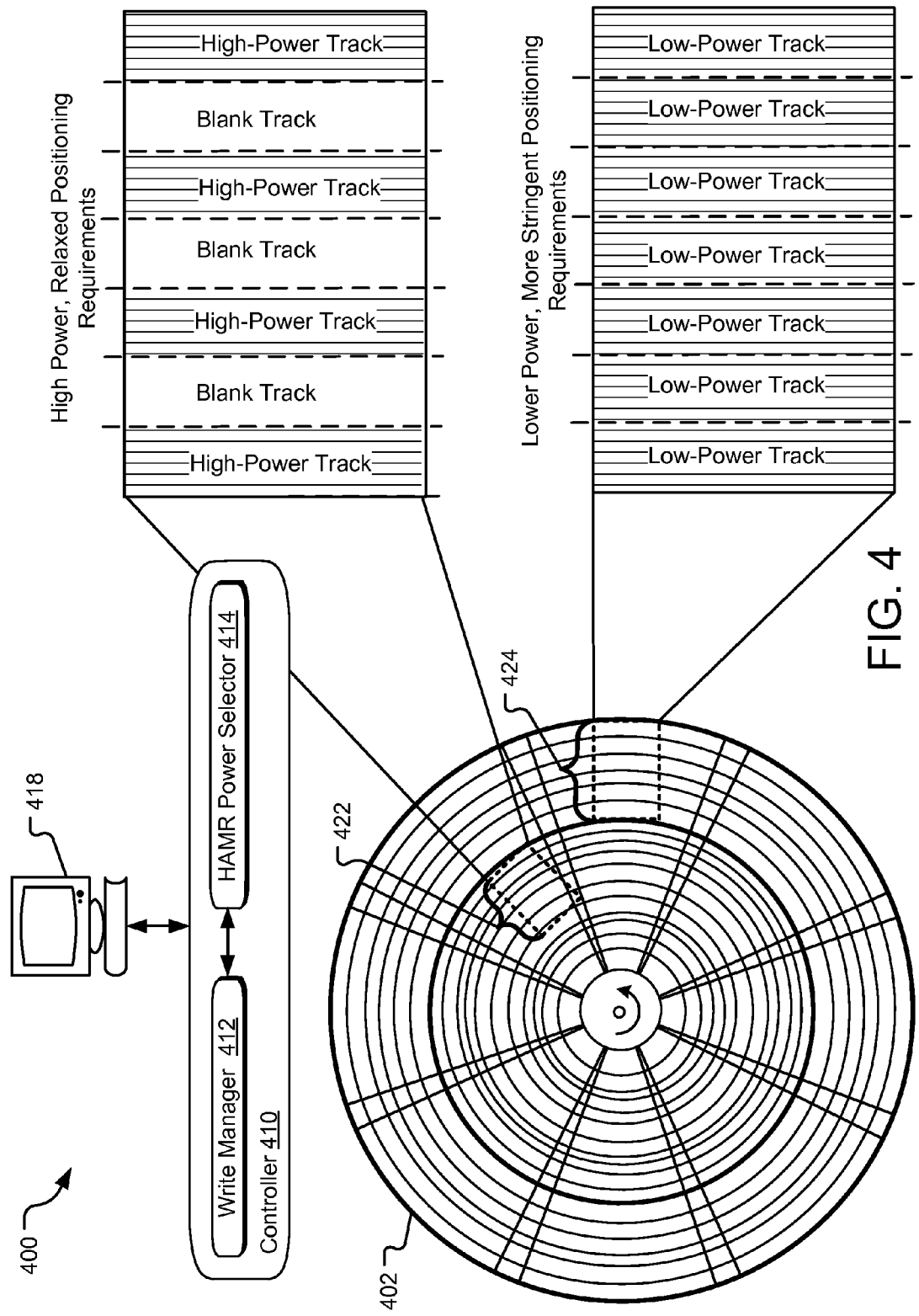
FIG. 4 illustrates still other data management techniques in an example HAMR device.

FIG. 4 illustrates still other data management techniques in an example storage device 400. The storage device 400 includes a controller 410 for reading and writing data to a BPM 402. The BPM 402 is partitioned into at least two regions. In a first region 422 (e.g., a radial zone), data is stored on alternating data tracks and written to the BPM 402 at a first heat source power (e.g., laser power) of a HAMR head. Within the first region 422, OCLIM write requirements are relaxed and OCLIM is large as compared to an OCLIM associated with a second region 424. No data is stored in the interlaced tracks between each of the alternating, data-storing tracks.

In the second region 424, data is stored on every track and written to the BPM 402 at a second heat source power lower than the first heat source power. Within the second region 422, OCLIM write requirements are more stringent (e.g., narrower OCLIM) than in the first region 422, guaranteeing a more precise alignment between each target data track and a HAMR head during each write operation.

The controller 410 includes a write manager 412 and a HAMR power selector 414 for selecting between at least the first and second power levels. In some implementations, the HAMR power selector 414 optionally selects between more than two power layers for writing data to a particular region (e.g., radial zone) of the BPM 402.

To determine where to direct incoming data, the write manager 412 calculates an expected on-track error rate. In one implementation, the expected on-track error rate is calculated assuming that a low power is used, such as the low power associated with data writes to the second region 424. Calculating the expected on-track error rate may take into account a number of other factors such as write history to the target data track (e.g., previous error rates) and environmental conditions within the storage device 400 including without limitation shock conditions, vibration conditions, temperature conditions, etc. For example, an expected error rate may increase when temperature or vibration are particularly high within the storage device 400.

When data is written at a lower power while the storage drive 400 is subjected to extreme write conditions due to shock, vibration, temperature, or other factors, the on-track write error rate may be so high that some errors cannot be corrected by an error correction code (ECC) of the storage device. Therefore, the controller 410 may direct data writes to the first region 422 whenever one or more of these extreme write conditions is detected. For example, the write manager 412 may calculate an expected on-track error rate using data from one or more vibration, temperature, or pressure sensors within the storage device 400.

After calculating an expected on-track error rate, the write manager 412 compares the expected on-track error rate to an error tolerance threshold, such as a threshold provided by a host device 418. In one implementation, the error tolerance threshold is a threshold based on the corrective power and redundancies of various decoders (e.g., ECC) of the storage device 400. If the expected error rate (e.g., calculated assuming the second heat source power) exceeds the error tolerance threshold from the host device 418, the write manager 412 directs the data write to the first region 422 (where the data is written to alternating data tracks at the high power) and the HAMR power selector 414 selects a higher power for the data write. In one implementation, the controller 410 executes a read operation to read back data immediately after it is written to the first region 424. This allows for early identification and correction of write errors.

If, on the other hand, the expected on-track error rate does not exceed the error tolerance threshold, the write manager 412 directs the write to the second region 424 and the HAMR power selector 414 selects a second heat source power that is lower than the first heat source power for performing the data write.

In another implementation, the first region 422 is a cache region where data is written to the alternating data tracks at the higher heat source power with relaxed positioning requirements (e.g., large OCLIM). For example, the write manager 412 may write all new data to the first region 422 at the high heat source power for temporary storage. When the storage device 400 is idle, the controller 410 transfers data from the cache to other areas of the BPM 402, such as the second region 424 where data is stored on consecutive data tracks at a lower heat source power with tighter positioning requirement (e.g., narrow OCLIM).

In one implementation, a grouping of potential heat source power settings is specific to a radial zone of the BPM 402. For example, the HAMR power selector 414 may select between two heat source powers (e.g., a high power and a low power) for writing to a first radial zone, and another two heat source powers for writing to another radial zone, etc. In some implementations, the HAMR power selector 414 selects between more than two potential heat source powers for a data write within a particular radial zone.

Figure 5:
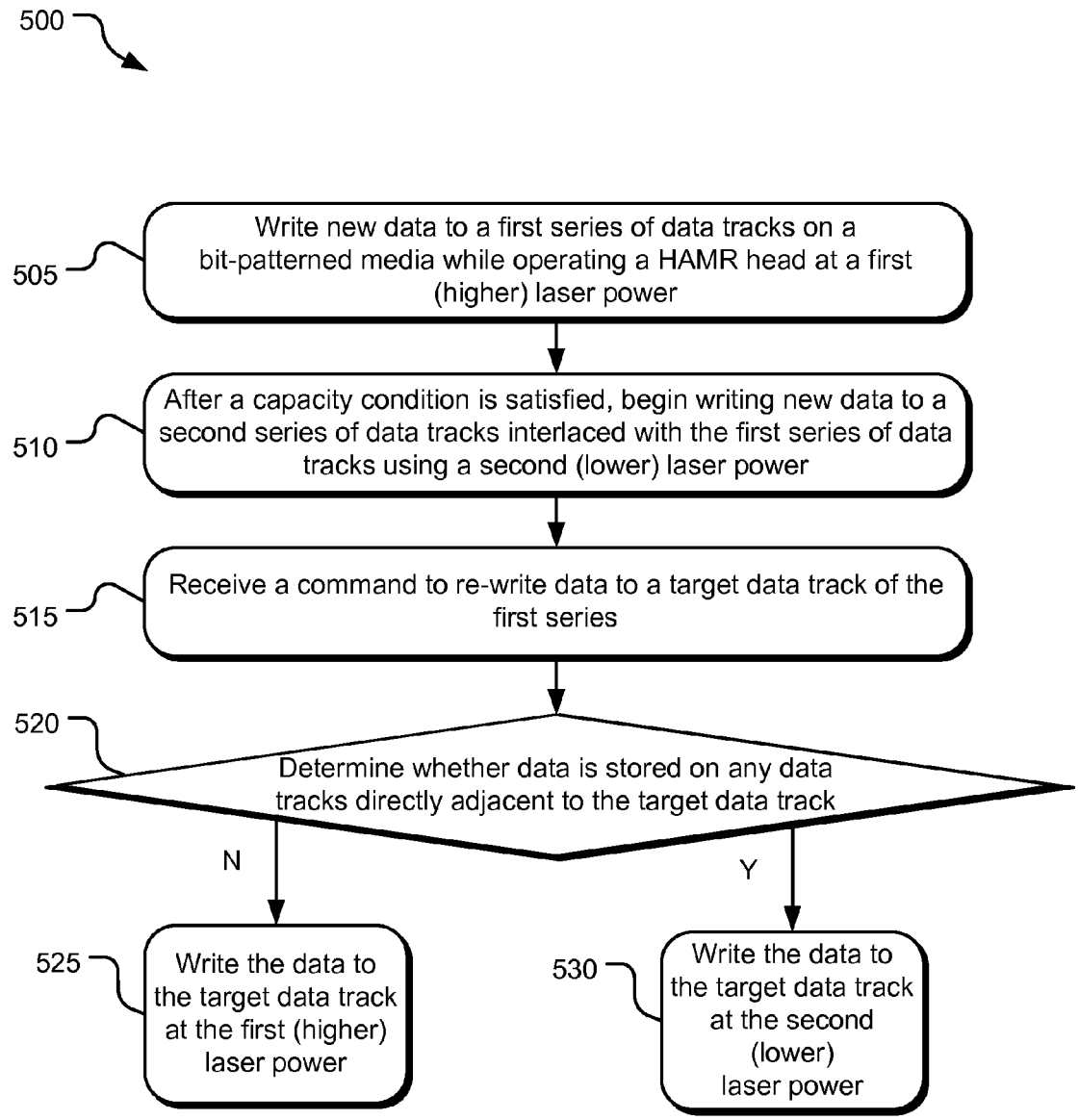
FIG. 5 illustrates example operations for writing data to a BPM in a HAMR recording device.

FIG. 5 illustrates example operations 500 for writing data to a BPM in a HAMR recording device. A write operation 505 writes new data to a first series of alternating data tracks on the BPM while operating a HAMR head at a first heat source power. For example, the write operation 505 may write data to a series of alternating data tracks, leaving blank every-other data track in a region of the BPM for a period of time. In one implementation, the write operation 505 writes data to alternating data tracks until a determination operation (not shown) determines that a capacity condition is satisfied. For example, the capacity condition may be satisfied when 50% of the data tracks on the BPM or in a given radial zone of the disc store data.

After the capacity condition is satisfied, another write operation 510 begins writing new data to a second series of alternating data tracks interlaced with the first series of alternating data tracks. The writes of new data to the second series of alternating data tracks are performed while operating a laser of a HAMR head at second heat source power lower than the first heat source power used to write the first series of alternating data tracks. In one implementation, positioning requirements of the HAMR head are relaxed when operating the laser at the first (higher) power as compared to when operating the laser at the second (lower) power.

A receiving operation 515 receives a command to re-write a target data track of the first series of alternating data tracks, and a determination operation 520 determines whether the target data track is directly adjacent to any data-storing tracks. If no data is stored on any data tracks directly adjacent to the first data track, a write operation 525 writes data to the target data track at the first (higher) heat source power. If data is stored on one or more data tracks directly adjacent to the target data track, a write operation 530 writes data to the target data track at the second (lower) heat source power.

In at least one implementation, the determination operation 520 is not performed. If the capacity condition is satisfied, the target data track is re-written at the second (lower) power regardless of whether or not it is directly adjacent to a data-storing track.

Figure 6:
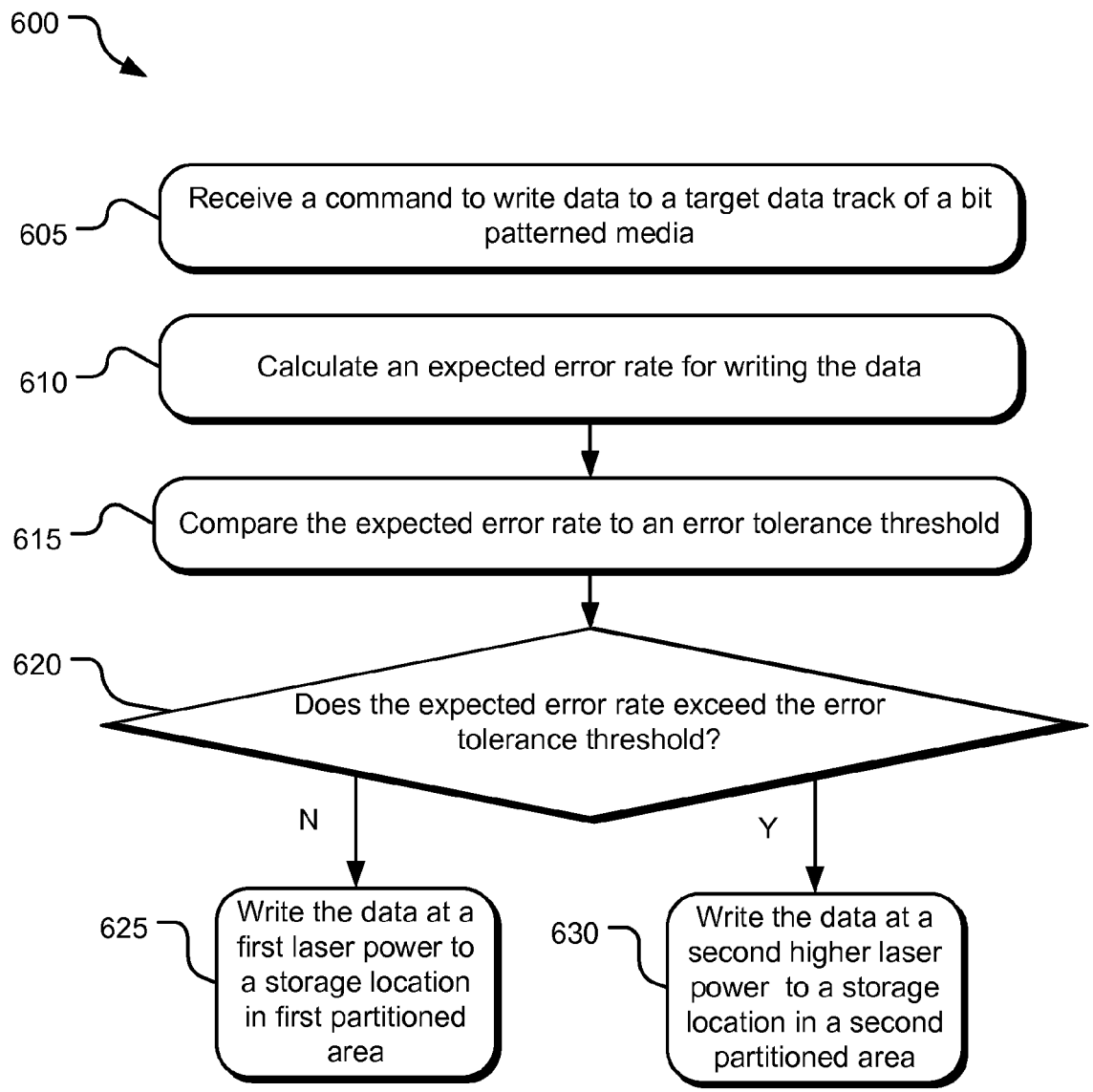
FIG. 6 illustrates example operations for selecting between a first heat source power and a second lower heat source power for a data write to a storage media.

FIG. 6 illustrates example operations 600 for selecting between a first heat source power and a second lower heat source power for a data write to a storage media. A receiving operation 605 receives a command to write data to a target data track. A calculation operation 610 calculates an expected on-track error rate for the re-write of the target data track. In one implementation, the calculation operation 610 calculates the expected on-track error rate assuming the re-write is performed while operating a HAMR head laser at a nominal power used when writing data to consecutive data tracks. Calculating the expected on-track error rate may take into account a number of factors including without limitation history to the target data track (e.g., previous error rates) and environmental conditions within the storage device including without limitation shock conditions, vibration conditions, temperature conditions, pressure conditions, etc.

A comparison operation 615 compares the calculated expected error rate to an error tolerance threshold, such as a threshold received from a host device. A determination operation 620 determines whether the expected error rate exceeds the error tolerance threshold. For example, the determination operation 620 determines whether the calculated expected error rate indicates that a number of write errors may exceed a maximum number of write errors correctable by a correction code of the storage device.

If the calculated expected error rate does not exceed the error tolerance threshold, a write operation 625 writes data of the write command to a first region of storage media at a nominal power (e.g., relatively low power compared to a power used to write data to other regions of the storage device, described below). In one implementation, the first region is a region including data stored on consecutive data tracks written at a nominal power with stringent positioning requirements of the HAMR head. A "nominal power" refers to, for example, a power for data writes to a consecutive series of tracks that is optimized for the written error and performance (such as adjacent track interference) during factory processes. One example of the "first region" is a radial zone. Another example of the first region is an entire disc included within a multi-disc storage device.

If, on the other hand, the calculated expected error rate exceeds the error tolerance threshold, a write operation 630 executes the write command to a second region of the storage media at a power higher than the nominal power used in the first region. In one implementation, the second region stores data on alternating data tracks and does not store data on any data tracks interlaced with the alternating data tracks. Data writes to the second region may be performed with positioning requirements of the HAMR head that are relaxed as compared to the positioning requirements imposed for data writes to the first region.

FIGS. 7A-7D illustrate various types of BPM that may be used in association with the disclosed data management techniques. FIG. 7A illustrates a staggered single-track BPM 705, while FIG. 7B illustrates a staggered hypertrack BPM 710. Each of the staggered single-track BPM 705 and the staggered hypertrack BPM 710 has a track pitch defined to correspond to a write width of a HAMR head.

In one implementation utilizing the staggered hypertrack BPM 710, a HAMR head magnetizes two subtracks at once (e.g., subtracks 712 and 714). Therefore, data may be read and written to the staggered hypertrack BPM 710 using various "shingled magnetic recording" techniques that provide for reading and writing of multiple data tracks when a single data track is updated. Some of the disclosed data management techniques provide for writing data on every other subtrack (e.g., subtracks 712 and 714) at a high heat source power with relaxed positioning requirements. Still other data management techniques provide for writing data to each consecutive subtrack with a lower heat source power and narrower positioning requirements.

FIG. 7C illustrates a non-staggered rectangular BPM 715 while FIG. 7D illustrates a non-staggered hexagonal BPM 720. Each of the BPM 705, 710, 715, and 720 is suitable for receiving and storing data according to the data management techniques discussed with respect to FIGS. 1-6.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A storage device comprising: a heat-assisted magnetic recording (HAMR) head including a heat source; and a controller that selects a power for the heat source to write data to a target data track based on whether the target data track is bounded by any data-storing tracks, the controller configured to relax a positioning requirement of the HAMR head when writing data while operating the heat source at a first power and tighten the positioning requirement of the HAMR head while operating the heat source at a second power.

2. The storage device of claim 1, wherein the controller selects the first power if the target data track is not bounded by any data-storing tracks and selects the second power which is lower than the first power if the target data track is bounded by at least one data-storing track.

3. The storage device of claim 2, wherein the controller is configured to write data to a series of alternating data tracks at the first power until a capacity condition is satisfied.

4. The storage device of claim 1, wherein the storage device includes a bit patterned medium (BPM).

5. One or more non-transitory computer-readable storage media encoding computer-executable instructions for executing on a computer system a computer process, the computer process comprising:
   operating a heat-assisted magnetic recording (HAMR) head heat source at a first power to write data to a target data track of a storage medium;
   receiving an instruction to re-write the target data track; and
   determining whether the target data track is bounded by a data-storing track; and
   based on the determination, selecting a second lower power if the target data track is directly adjacent to one or more data storing tracks.

6. The one or more non-transitory computer-readable storage media of claim 5, wherein the computer process further comprises:
   selecting the first power if the target data track is not directly adjacent to one or more data-storing tracks.

7. The one or more non-transitory computer-readable storage media of claim 5, wherein the target data track is a data track of a bit patterned medium (BPM).

8. The one or more non-transitory computer-readable storage media of claim 5, wherein the computer process further comprises:
   implementing a first positioning requirement for the HAMR head when operating the heat source at the first power;
   implementing a second positioning requirement for the HAMR head when operating the heat source at the second lower power, the first positioning requirement being relaxed relative to the second positioning requirement.

9. One or more non-transitory computer-readable storage media encoding computer-executable instructions for executing on a computer system a computer process, the computer process comprising:
   selecting between a first region and a second region of a storage medium to write data of a write command;
   if the first region is selected, writing data to a series of alternating data tracks while operating a heat assisted magnetic recording (HAMR) head heat source at a first power; and
   if the second region is selected, writing data to a series of directly adjacent consecutive data tracks while operating the HAMR head heat source at a second power lower than the first power.

10. The one or more non-transitory computer-readable storage media of claim 9, wherein the first region is a cache region and the computer process further comprises:
    initially writing new data to the first region and moving the data to the second region during an idle period of a storage device.

11. The one or more non-transitory computer-readable storage media of claim 9, wherein the computer process further comprises:
 calculating an expected write error rate for writing data to the storage medium, the expected error rate based on environmental conditions within a recording device.

12. The one or more non-transitory computer-readable storage media of claim 11, further comprising:
 selecting between the first region and the second region based on the expected error rate.

13. The one or more non-transitory computer-readable storage media of claim 11, wherein the computer process further comprises:
 if the expected error rate satisfies an error tolerance condition, writing data of the write command to the first region of the storage medium while operating the HAMR head heat source at the first power.

14. The one or more non-transitory computer-readable storage media of claim 13, wherein the error tolerance condition is provided by a host device.

15. The one or more non-transitory computer-readable storage media of claim 13, wherein the computer process further comprises:
 if the expected error rate does not satisfy the error tolerance condition, writing data of the write command to the second region of the storage medium while operating the HAMR head heat source at the second power.

16. The one or more non-transitory computer-readable storage media of claim 9, wherein a positioning requirement of the HAMR head is relaxed within the first region relative to the second region.

17. The one or more non-transitory computer-readable storage media of claim 11, wherein the environmental conditions within the recording device include vibrations.

18. The one or more non-transitory computer-readable storage media of claim 11, wherein the environmental conditions within the recording device include temperature.

* * * * *